(No Model.)
H. VON MITZLAFF.
SLIDE VALVE.
No. 477,088. Patented June 14, 1892.
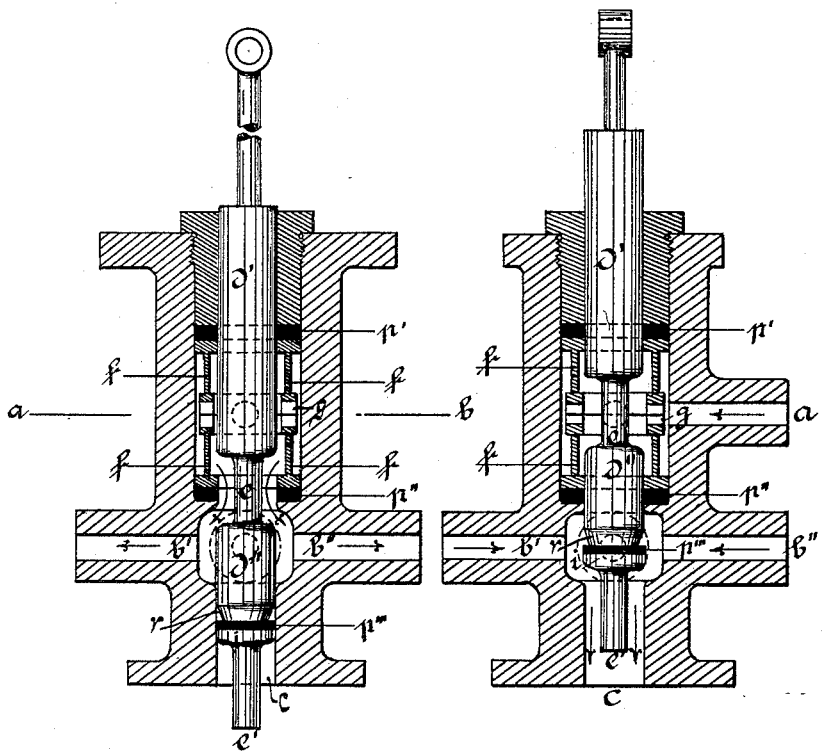
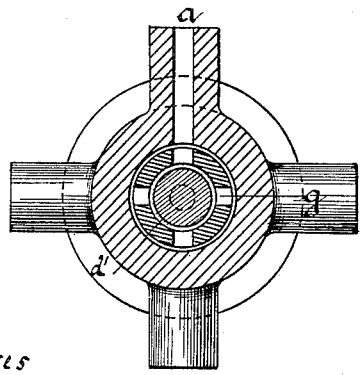
Fig. 3
Section a—b.
Witnesses
William L. Miller
Edward Wolff
Inventor
Hermann von Mitzlaff.
by VanSantvoord & Hauff
his attorneys

UNITED STATES PATENT OFFICE.

HERMANN VON MITZLAFF, OF BERLIN, GERMANY.

SLIDE-VALVE.

SPECIFICATION forming part of Letters Patent No. 477,088, dated June 14, 1892.

Application filed September 12, 1891. Serial No. 405,538. (No model.)

*To all whom it may concern:*

Be it known that I, HERMANN VON MITZLAFF, a subject of the King of Prussia, residing at Berlin, in the Kingdom of Prussia and German Empire, have invented new and useful Improvements in Slide-Valves, of which the following is a specification.

The annexed drawings illustrate the packing forming the object of this invention applied to the movable piston of a piston-valve, which valve serves to regulate the inflow and outflow of the fluid under pressure from an accumulator or pump to one or more pressure-cylinders.

In the drawings, Figure 1 is a vertical central section of the valve. Fig. 2 is a similar section as Fig. 1, with parts in a different position than in Fig. 1. Fig. 3 is a section along $a\,b$, Fig. 1.

The inlet $a$ communicates with a conduit (not shown) for the fluid under pressure. The outlets $b'\,b''$ allow the fluid to enter the conduits leading to the operating receivers or vessels.

The discharge is indicated by $c$.

The piston consists of two parts or cylinders $d'\,d''$, connected by a stem or narrow portion $e$. The part $d'$ serves to shut off the fluid from the outlets $b'\,b''$, and the part $d''$ serves to close the discharge. When the piston is in the position shown in Fig. 1, the fluid enters through inlet $a$ and passes by the stem $e$ to the outlets $b'\,b''$, and thence to the point or points of use. When in the position shown in Fig. 2, the fluid passes off from the point of use through the outlets $b'\,b''$ to the discharge $c$.

The packings $p'\,p''$ are made in ring form and inserted into the valve-chamber. These packings are exposed to the pressure of the fluid by the following arrangement.

A hollow cylinder composed of two parts or sections $f\,f$ and flanged at its upper and lower ends is inserted into the valve-chamber, the lower flange resting on the packing $p''$, the upper flange supporting the packing $p'$. The fluid entering through inlet $a$ can pass into the interior of the hollow cylinder through an opening or openings $g$, formed, preferably, at the joint or seam of the two sections of the cylinder. The fluid entering under pressure into the interior of the hollow cylinder $f\,f$ will tend to spread or separate the cylinder-sections and cause them to press on the packing-rings $p'\,p''$ and spread the latter, so as to expand them against the pistons $d'\,d''$. If the pressure of fluid is so great that the packing might thereby be destroyed, the cylinder-sections $f\,f$ can have their contiguous rims extended or reinforced by flanges, so that the pressure or rush of fluid to the packing is diminished as the extent of the flange-like reinforcements is increased. When in the position shown in Fig. 1, the piston $d''$ closes the discharge $c$ by means of the packing $p'''$. The piston $d''$ has an annular groove $r$, triangular in cross-section, so as to form a rim $i$, on which the packing-ring $p'''$ rests. When the fluid coming from inlet $a$ past the stem $e$ strikes the packing-ring $p'''$, the latter is expanded, so as to be forced or spread against the wall of the chamber and effect a tight closure of the discharge $c$. If the packing $p'''$ consists of a disk of rubber or leather, then the rim $i$ may consist of a nut to facilitate the insertion of the packing. This nut can be screwed onto the stem $e'$, which would be suitably threaded for this purpose; or the stem $e'$, with the rim $i$, might be formed or cast as a separate piece and provided with a screw-stem for engaging a suitably-tapped hole in the body of the piston.

What I claim as new, and desire to secure by Letters Patent, is—

1. A valve having a sliding piston, in combination with packings $p'\,p''$ for said piston and hollow cylinder-sections $f\,f$, placed between said packings, said cylinder-sections having flanges made to bear against the packings and being provided with an opening for the entrance of fluid into the sections to spread the latter, substantially as described.

2. A valve having a sliding piston, in combination with the packings $p'\,p''$ for said piston and hollow cylinder-sections placed between the packings and made to bear against the latter by the pressure of the fluid, said piston having an undercut groove $r$ and a rim $i$, with a packing $p'''$ supported by said rim, substantially as described.

In testimony whereof I have hereunto set my hand in the presence of two subscribing witnesses.

HERMANN VON MITZLAFF.

Witnesses:
 W. HAUPT,
 J. MONOD VON FROIDEVILLER.